(Model.)

2 Sheets—Sheet 1.

J. ROBERTSON.
MACHINE FOR MAKING LEAD TRAPS.

No. 254,697.

Patented Mar. 7, 1882.

Witnesses.
Henry F. Parker.
John C. Tunbridge.

Inventor:
John Robertson
by his Attorneys
Briesen & Betts

N. PETERS, Photo-Lithographer, Washington, D. C.

(Model.)
2 Sheets—Sheet 2.
J. ROBERTSON.
MACHINE FOR MAKING LEAD TRAPS.
No. 254,697. Patented Mar. 7, 1882.
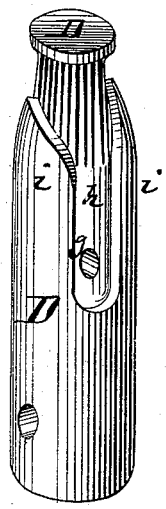
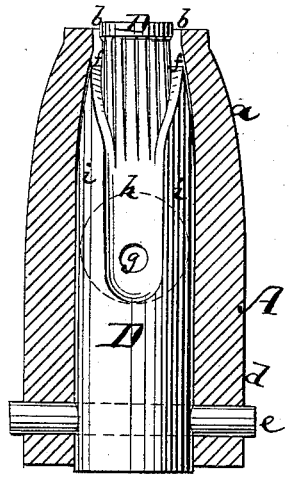
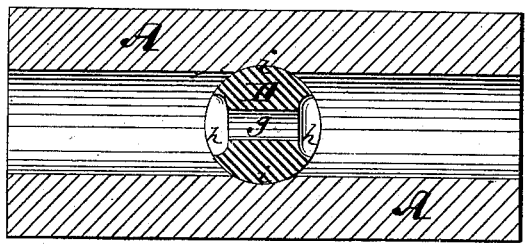

UNITED STATES PATENT OFFICE.

JOHN ROBERTSON, OF BROOKLYN, NEW YORK, ASSIGNOR TO E. W. BLATCHFORD & CO., OF CHICAGO, ILLINOIS.

MACHINE FOR MAKING LEAD TRAPS.

SPECIFICATION forming part of Letters Patent No. 254,697, dated March 7, 1882.

Application filed August 22, 1881. (Model.)

*To all whom it may concern:*

Be it known that I, JOHN ROBERTSON, of Brooklyn, in the county of Kings and State of New York, have invented an Improved Machine for Making Lead Traps, of which the following is a specification.

Figure 1:
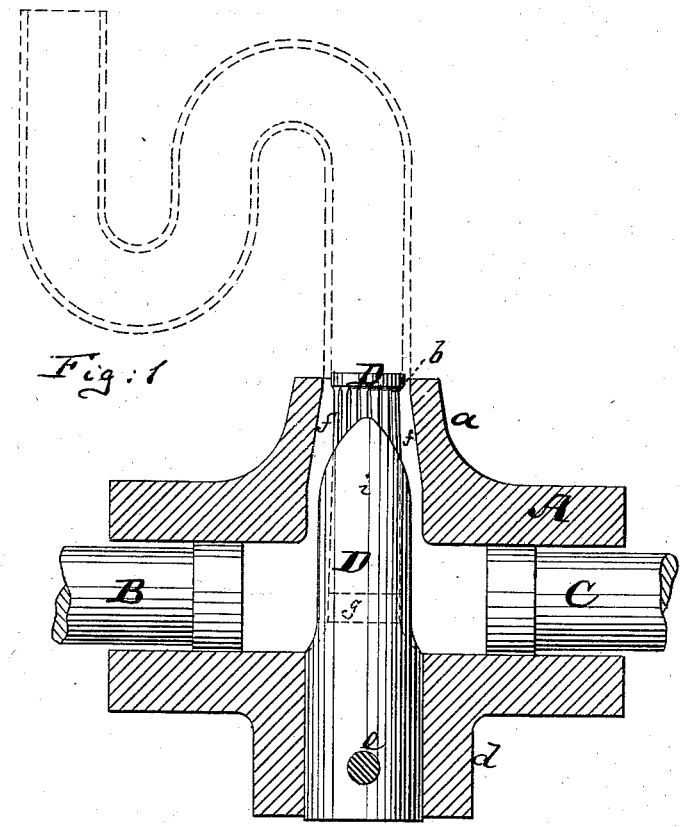
Figure 2:
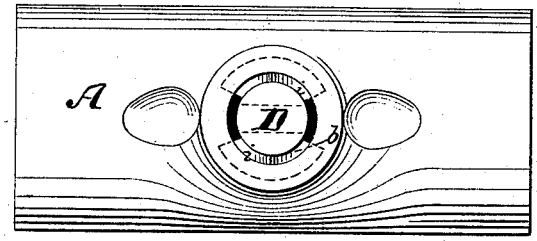

Figure 1 is a longitudinal vertical section of my improved machine for making lead traps, the trap being indicated by dotted lines. Fig. 2 is a top view of the machine. Fig. 3 is a vertical cross-section of the same; Fig. 4, a horizontal section through the center of the cylinder, and Fig. 5 a perspective view of the core.

This invention relates to an improvement in that class of machines which are used to shape lead by pressure into S-shaped and other curved traps or tubes—such as, for example, the trap indicated by dotted lines in Fig. 1. Heretofore such traps were made by hydraulic pressure, either by using one cylinder and plunger and a movable diaphragm to regulate the outlet or by using two separate cylinders and plungers jointly. In the latter case each plunger would have to be moved to make each curve the one with greater the other with less speed.

My invention consists in the construction of a two-plunger machine, said plungers being in line in one cylinder, and combined with a core which allows communication from one side of it to the other, so that when one of the plungers alone is moved the metal will be forced out through the annular orifice from both sides of the core. Thus I am enabled to produce a curve by moving one plunger only and the reverse curve by moving the other plunger only, though able, whenever desired, to move both plungers simultaneously, which is necessary when straight pipes are to be produced, and also at times when it is desirable in making longer or shorter curves.

In the accompanying drawings, the letter A represents a hydraulic cylinder receiving two plungers, B and C, one at each of its ends, and having projecting from it, between said ends, the nozzle $a$, into which the core D enters, so as to produce an annular discharge-opening, $b$, within the nozzle indicated in Fig. 2. The core D is rigidly secured in the lower part of the cylinder A either by being fitted into a socket, $d$, prepared for its reception, as indicated in Fig. 1, or by fastening pin or pins $e$, or both, or by being screwed into place, or in any other suitable manner. The core D is, by preference, of such a diameter that it will match or even exceed the diameter of the bore of the cylinder A, as thereby it receives a strong support throughout its length up to where it forms the constriction-chamber $f$ in the nozzle $a$, as shown in Figs. 3 and 4. An aperture, $g$, is formed through the core D in line with the plungers B and C, so that the cylinder will not be entirely interrupted by the core; but its chambers will be in communication with one another. This enables me, by moving one of the plungers, to force part of the contents of the cylinder through the aperture $g$ toward the other plunger and to the other side of the core.

In order to permit the proper discharge of the lead from the cylinder into the constriction-chamber, and thence through the outlet $b$, I form, when I use the aperture $g$, two vertical channels, $h$, that extend upward from said aperture to the upper portion of the core. Really these channels are made to leave the staying-ribs $i$ on each side, whereby the core-piece is stayed and securely held in its position; but I desire it to be distinctly understood that whenever the character of the machine, the strength of its parts, or the resistance of the material operated upon warrants it, I may dispense with the aperture $g$ through the core, and in lieu thereof use a core of such reduced diameter, or with grooves at its sides, as to allow the passage of the material—such as lead, for example—around or past the core from one end of the cylinder to the other. The communicating passage may be formed in the body of the cylinder itself.

The operation of my machine is as follows: The cylinder A is first charged with the requisite quantity of lead or other substance to be formed into a bent tube or trap. Preferably equal amounts should be on each side of the core in starting. Now, in order to make a straight tube, both plungers B and C are moved with equal speed toward the core by suitable means—such as hydraulic machinery. This will force the lead or other matter out through the mouth *b* in equal ratio all around the core and produce a straight pipe. Whenever a bend is to be produced only one of the plungers need be moved—namely, the one on the side on which the greatest amount of material is to be ejected from the orifice *b*. This one moving plunger will force the greater portion of the lead or other substance out through the outlet *b* on its side of the core, but at the same time will also supply the other side of the core through the orifice *g* to a sufficient extent to produce the short bend in the curve. Hence the diameter of the aperture *g* should be gaged to permit the passage through it of the necessary quantity of lead that will make the short bend properly proportioned to the long bend, and I therefore prefer to have a separate core for every differently-curved trap which is to be produced on the machine, yet I am able with my machine, without changing the core, to vary the character of the curve, for either by moving the other plunger with less speed toward the core than the main moving plunger, or by causing the second plunger to recede from while the first plunger advances toward the core, the character of the bend may be materially varied, either to make it shorter or longer. When, instead of a perforated core, a core is used of a diameter less than that of the bore of the cylinder A, or with grooves or passages at the side, the same result will be obtained—namely, the metal will by the moving plunger be forced out on both sides of the core in different degrees, so as to produce a curve.

I am aware that it is not new to combine a core with a cylinder having two plungers, such being shown in the patent granted to Isaac Adams on the 8th day of March, 1848, No. 5,466, and I expressly desire it to be understood that my invention principally consists in establishing the communication through or past the core between the two portions of the cylinder into which said core is placed.

I claim—

1. In a machine for making lead traps, the combination of the cylinder A, containing two plungers, B C, with the perforated or reduced core D and outlet-nozzle *a*, all constructed to leave a passage in line with the plungers from one end of the cylinder to the other, past or through the core, so that when one plunger is moved the lead will be ejected from the cylinder on both sides of the core, substantially as specified.

2. In combination with the cylinder A, having two plungers, B C, the core D, having aperture *g*, substantially as specified.

3. In combination with the cylinder A, having two plungers, B C, the core D, having aperture *g* and staying-ribs *i i*, substantially as specified.

JOHN ROBERTSON.

Witnesses:
  A. V. BRIESEN,
  JULIUS HÜLSEN, Jr.